(12) United States Patent
Zhang et al.

(10) Patent No.: US 10,194,331 B2
(45) Date of Patent: Jan. 29, 2019

(54) REMOTE RADIO UNIT HUB (RHUB), INDOOR COMMUNICATIONS SYSTEM, AND SIGNAL TRANSMISSION METHOD

(71) Applicant: Huawei Technologies Co., Ltd., Shenzhen (CN)

(72) Inventors: Yong Zhang, Shanghai (CN); Jinsong Hong, Chengdu (CN); Qiongtao Ren, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/337,819

(22) Filed: Oct. 28, 2016

(65) Prior Publication Data

US 2017/0048726 A1    Feb. 16, 2017

Related U.S. Application Data

(63) Continuation of application No. PCT/CN2014/076501, filed on Apr. 29, 2014.

(51) Int. Cl.
| | |
|---|---|
| *H04W 40/00* | (2009.01) |
| *H04W 16/26* | (2009.01) |
| *H04W 88/08* | (2009.01) |
| *H04W 84/04* | (2009.01) |

(52) U.S. Cl.
CPC ............ *H04W 16/26* (2013.01); *H04W 88/08* (2013.01); *H04W 84/042* (2013.01); *H04W 88/085* (2013.01)

(58) Field of Classification Search
CPC ... H04W 16/26; H04W 88/08; H04W 88/085; H04W 84/042

USPC .......................................... 455/449; 370/338
See application file for complete search history.

(56) References Cited

U.S. PATENT DOCUMENTS

| | | | |
|---|---|---|---|
| 7,286,507 B1 | 10/2007 | Oh et al. | |
| 2008/0045254 A1 | 2/2008 | Gupta et al. | |
| 2011/0237178 A1* | 9/2011 | Seki ...................... | H04W 36/18 455/3.01 |
| 2012/0155446 A1 | 6/2012 | Machida | |
| 2012/0163299 A1 | 6/2012 | Chen et al. | |
| 2013/0051329 A1 | 2/2013 | Take | |
| 2015/0244840 A1* | 8/2015 | Chakrabarti ........ | H04L 61/6059 370/328 |

FOREIGN PATENT DOCUMENTS

| | | |
|---|---|---|
| CN | 1845473 A | 10/2006 |
| CN | 101102606 A | 1/2008 |

(Continued)

*Primary Examiner* — Marcos Batista
(74) *Attorney, Agent, or Firm* — Slater Matsil, LLP

(57) ABSTRACT

Embodiments disclose a remote radio unit hub (RHUB), an indoor communications system, and a signal transmission method. The RHUB includes an input port module, a first output port module, and a processing module. The input port module is configured to connect to a baseband unit (BBU) in a wired manner and receive a first communications signal sent by the BBU. The first output port module is configured to connect to another RHUB in a wired manner. Additionally, the processing module is configured to send, according to the first communications signal received by the input port module, a second communications signal to the another RHUB by using the first output port module.

22 Claims, 7 Drawing Sheets

(56) References Cited

FOREIGN PATENT DOCUMENTS

| | | | |
|---|---|---|---|
| CN | 101247576 | A | 8/2008 |
| CN | 102077483 | A | 5/2011 |
| CN | 103139941 | A | 6/2013 |
| EP | 2592863 | A1 | 5/2013 |
| JP | 2011254415 | A | 12/2011 |
| JP | 2012134708 | A | 7/2012 |
| WO | 2013072138 | A1 | 5/2013 |

\* cited by examiner

REMOTE RADIO UNIT HUB (RHUB), INDOOR COMMUNICATIONS SYSTEM, AND SIGNAL TRANSMISSION METHOD

CROSS-REFERENCE TO RELATED APPLICATIONS

This application is a continuation of International Application No. PCT/CN2014/076501, filed on Apr. 29, 2014, the disclosure of which is hereby incorporated by reference in its entirety.

TECHNICAL FIELD

Embodiments relates to the field of wireless communications technologies, and in particular, to a remote radio unit hub (RHUB), an indoor communications system, and a signal transmission method.

BACKGROUND

With the development of communications technologies, more mobile services occur indoors nowadays. According to statistics, it is found that voice services that occur indoors account for nearly 70% of voice services in a communications network system, and traffic of data services that occur indoors accounts for nearly 90% of total traffic of data services in the communications network system.

Currently, newly added UMTS (Universal Mobile Telecommunications System) and LTE (Long Term Evolution) are basically deployed on a 2 GHz frequency band (it should be noted that, compared with 900 Hz, 2 GHz belongs to a high frequency band signal). However, a high frequency band signal has a weaker penetrability than a low frequency band signal; as a result, newly established 3G and 4G networks have a problem that quality of indoor signal coverage is low within a deployment range, and therefore, an indoor requirement cannot be met.

Based on the foregoing situation, an indoor signal coverage technology emerges. Common indoor signal coverage systems are generally classified into an active indoor signal coverage system and a passive indoor signal coverage system.

A typical active indoor signal coverage system is an iDBS (indoor distributed base station) system; and a typical passive indoor signal coverage system is a DAS (distributed antenna system).

The DAS includes a BBU (baseband unit), an RRU (remote radio unit), a combiner, an antenna device, and the like. A working principle of the DAS is that: after the BBU sends a signal to the RRU and the RRU converts the signal into a radio frequency signal, the radio frequency signal is led into a room by using a transmission device such as a radio frequency feeder, a combiner/splitter, or an antenna. In the DAS system, after the splitter performs splitting processing on the radio frequency signal processed by the RRU, the radio frequency signal is distributed to an indoor user equipment by using the antenna device; and after a feedback signal passes through the combiner and undergoes simple superposition, the indoor user equipment transmits the feedback signal to the RRU by using the radio frequency feeder. It can be seen that, in the DAS, a signal is processed by using a combiner/splitter. Although the working principle is simple, relatively high system noise, a small signal transmission capacity, and relatively poor indoor signal quality are easily caused.

However, the iDBS system uses a three-layer structure: BBU-RHUB (RRU Hub, remote radio unit hub)-RRU. One BBU may be connected to multiple RHUBs, and each RHUB may be connected to multiple RRUs. An RHUB and an RRU are connected by using a network cable, where the network cable mainly completes signal distribution and aggregation, and supplies power to the RRU; and functions of the BBU and the RRU are the same as those of the BBU and the RRU in the DAS system.

Use of an RHUB device in the iDBS system avoids problems of relatively high system noise and relatively poor indoor signal quality that are caused by a combiner/splitter; however, because a structure of an indoor signal coverage system constructed by using RHUB devices in the iDBS system is simple, an extension capability of the indoor signal coverage system is restricted, and a capacity requirement of a data service burst for the indoor signal coverage system cannot be met.

SUMMARY

Embodiments provide a remote radio unit hub (RHUB), an indoor communications system, and a signal transmission method, which are used to resolve a problem in the prior art that because a structure of an indoor signal coverage system constructed by using RHUB devices is simple, an extension capability of the indoor signal coverage system is poor, and further, a capacity requirement of a data service burst for the indoor signal coverage system cannot be met.

According to a first aspect of embodiments, a RHUB is provided, including an input port module, a first output port module, and a processing module. The input port module is configured to connect to a baseband unit (BBU) in a wired manner and receive a first communications signal sent by the BBU. Also, the first output port module is configured to connect to another RHUB in a wired manner. Additionally, the processing module is configured to send, according to the first communications signal received by the input port module, a second communications signal to the another RHUB by using the first output port module.

With reference to the first aspect of embodiments, in a first possible implementation manner, the first communications signal includes identification information used to indicate a destination address of the first communications signal; and the processing module is specifically configured to determine, according to the identification information, whether the destination address of the first communications signal is the another RHUB; and if yes, send, according to the first communications signal, the second communications signal to the another RHUB by using the first output port module.

With reference to the first aspect of embodiments, or with reference to the first possible implementation manner of the first aspect of the embodiments, in a second possible implementation manner, the first output port module is specifically configured to connect to the another RHUB by using a common public radio interface (CPRI) link.

With reference to the first aspect of embodiments, with reference to the first possible implementation manner of the first aspect of embodiments, or with reference to the second possible implementation manner of the first aspect of embodiments, in a third possible implementation manner, the RHUB further includes: a second output port module, where the second output port module is configured to connect to a remote radio unit RRU in a wired manner.

With reference to the third possible implementation manner of the first aspect of the embodiments, in a fourth possible implementation manner, the processing module is further configured to: send, according to the first communications signal received by the input port module, a third communications signal to the RRU by using the second output port module; or when the first communications signal includes the identification information used to indicate the destination address of the first communications signal, and the destination address, indicated by the identification information, of the first communications signal is the RRU, send, according to the first communications signal, a third communications signal to the RRU by using the second output port module.

With reference to the third possible implementation manner of the first aspect of the embodiments, or with reference to the fourth possible implementation manner of the first aspect of the embodiments, in a fifth possible implementation manner, the second output port module includes at least two second output ports; and the second output port module is specifically configured to connect to the same RRU separately by using transmission links connected to the at least two second output ports.

With reference to the fifth possible implementation manner of the first aspect of the embodiments, in a sixth possible implementation manner, the processing module is specifically configured to: determine a network standard of the first communications signal received by the input port module; select, according to the network standard of the first communications signal and a preset correspondence between a network standard and the at least two second output ports, a second output port for outputting the third communications signal; and transmit the third communications signal to the RRU by using the selected second output port.

With reference to the sixth possible implementation manner of the first aspect of the embodiments, in a seventh possible implementation manner, the processing module is further configured to: when the number of selected second output ports is greater than or equal to 2, determine signal carrying capabilities of the transmission links connected to the selected second output ports; and distribute, according to the signal carrying capabilities of the transmission links connected to the selected second output ports, the third communications signal to each transmission link in the transmission links connected to the selected second output ports, to transmit the third communications signal to the RRU.

With reference to the seventh possible implementation manner of the first aspect of the embodiments, in an eighth possible implementation manner, the signal carrying capability includes a bandwidth capability; and the processing module is specifically configured to: when a bandwidth of the third communications signal to be transmitted on each of the transmission links is not greater than a bandwidth capability of each of the transmission links, adjust the bandwidth of the third communications signal to be transmitted on each of the transmission links to the bandwidth capability of each of the transmission links, and transmit the adjusted third communications signal to the RRU on each of the transmission links.

With reference to the seventh possible implementation manner of the first aspect of the embodiments, or with reference to the eighth possible implementation manner of the first aspect of the embodiments, in a ninth possible implementation manner, the processing module is further configured to: transfer, to a second transmission link in the transmission links connected to the selected second output ports, the third communications signal borne on a first transmission link in the transmission links connected to the selected second output ports, to transmit the third communications signal to the RRU.

With reference to the ninth possible implementation manner of the first aspect of the embodiments, in a tenth possible implementation manner, the processing module is specifically configured to: before transferring, to the second transmission link for transmission, the third communications signal borne on the first transmission link, transfer, to the second transmission link according to the bandwidth capability of the second transmission link and a current bandwidth of the third communications signal transmitted on the first transmission link and on the second transmission link, all or a part of the third communications signal borne on the first transmission link, to transmit the third communications signal to the RRU.

With reference to the possible implementation manners of the first aspect of the embodiments, with reference to the first possible implementation manner of the first aspect of the embodiments, with reference to the second possible implementation manner of the first aspect of the embodiments, with reference to the third possible implementation manner of the first aspect of the embodiments, with reference to the fourth possible implementation manner of the first aspect of the embodiments, with reference to the fifth possible implementation manner of the first aspect of the embodiments, with reference to the sixth possible implementation manner of the first aspect of the embodiments, with reference to the seventh possible implementation manner of the first aspect of the embodiments, with reference to the eighth possible implementation manner of the first aspect of the embodiments, with reference to the ninth possible implementation manner of the first aspect of the embodiments, or with reference to the tenth possible implementation manner of the first aspect of the embodiments, in an eleventh possible implementation manner, the input port module is further configured to receive a transmission link request message sent by the BBU, where the transmission link request message is used to request the RHUB to report information about a connection between the RHUB and an RHUB and/or an RRU; and the processing module is further configured to determine, according to the transmission link request message received by the input port module, information about a first connection between the first output port module and the another RHUB, and send the information about the first connection to the BBU; and/or, if the RHUB further includes the second output port module and the second output port module is connected to at least one RRU, determine, according to the transmission link request message, information about a second connection between the at least one RRU connected to the second output port module and the second output port module, and send the information about the second connection to the BBU.

According to a second aspect of the embodiments, a RHUB is provided, including an input port module, an output port module, and a processing module. The input port module is configured to connect to a first RHUB in a wired manner and receive a first communications signal sent by the first RHUB. Also, the output port module is configured to connect to a remote radio unit RRU in a wired manner. Additionally, the processing module is configured to send, according to the first communications signal received by the input port module, a second communications signal to the RRU by using the output port module.

According to a third aspect of the embodiments, an indoor communications system is provided, where the indoor communications system includes: a BBU, a first RHUB, a second RHUB, and a first remote radio unit RRU, where the first RHUB is configured to connect to the BBU, and receive a first communications signal sent by the BBU; the first RHUB is further configured to connect to the second RHUB, and send a second communications signal to the second RHUB according to the first communications signal; the second RHUB is configured to connect the first RHUB and the first RRU, and receive the second communications signal sent by the first RHUB; and the first RHUB is the RHUB according to any one of the possible implementation manners of the first aspect and the first aspect of the embodiments, and the second RHUB is the RHUB according to the second aspect of the embodiments.

With reference to possible implementation manners of the third aspect of the embodiments, in a first possible implementation manner, the indoor communications system further includes a second RRU, and the first RHUB is further configured to connect to the second RRU.

With reference to the possible implementation manners of the third aspect of the embodiments, or with reference to the first possible implementation manner of the third aspect of the embodiments, in a second possible implementation manner, the indoor communications system further includes a digital conversion unit DCU and a third RRU, where the first RHUB is specifically configured to connect to the BBU by using the DCU, and receive, by using the DCU, the first communications signal sent by the BBU, where the first communications signal is a digital signal; the third RRU is configured to connect to the DCU in a wired manner; and the DCU is configured to connect the third RRU, the BBU, and the first RHUB, and receive a third communications signal sent by the third RRU, where the third communications signal is a radio frequency signal; and convert the received third communications signal into a digital signal and multiplex the digital signal and the first communications signal on a same transmission link, to send the digital signal and the first communications signal to the first RHUB.

According to a fourth aspect of the embodiments, a signal transmission method is provided, including: receiving, by a first RHUB, a first communications signal sent by a BBU, where the BBU is connected to the first RHUB in a wired manner; and sending, by the first RHUB, a second communications signal to a second RHUB according to the received first communications signal, where the second RHUB is connected to the first RHUB in a wired manner.

With reference to possible implementation manners of the fourth aspect of the embodiments, in a first possible implementation manner, the first communications signal includes identification information used to indicate a destination address of the first communications signal; and the sending, by the first RHUB, a second communications signal to the second RHUB according to the received first communications signal includes: determining, according to the identification information, whether the destination address of the first communications signal is the second RHUB; and if yes, transmitting the second communications signal to the second RHUB.

With reference to the possible implementation manners of the fourth aspect of the embodiments, in a second possible implementation manner, the method further includes: sending a third communications signal to a remote radio unit RRU according to the received first communications signal, where the RRU is connected to the first RHUB.

With reference to the second possible implementation manner of the fourth aspect of the embodiments, in a third possible implementation manner, if the first communications signal includes identification information used to indicate a destination address of the communications signal, the sending a third communications signal to a remote radio unit RRU according to the received first communications signal includes: determining, according to the identification information, whether the destination address of the first communications signal is the RRU; and if yes, transmitting the third communications signal to the RRU.

With reference to the second possible implementation manner of the fourth aspect of the embodiments, or with reference to the third possible implementation manner of the fourth aspect of the embodiments, in a fourth possible implementation manner, the first RHUB and the RRU are connected by using at least two transmission links; and the sending a third communications signal to a remote radio unit RRU according to the received first communications signal includes: determining a network standard of the first communications signal; selecting, from the at least two transmission links according to the network standard of the first communications signal and a preset correspondence between a network standard and the at least two transmission links, a transmission link for transmitting the third communications signal; and transmitting the third communications signal to the RRU by using the selected transmission link.

With reference to the fourth possible implementation manner of the fourth aspect of the embodiments, in a fifth possible implementation manner, the transmitting the third communications signal to the RRU by using the selected transmission link includes: when the number of selected transmission links for transmitting the third communications signal is greater than or equal to 2, determining signal carrying capabilities of the selected transmission links; and distributing, according to the signal carrying capabilities of the selected transmission links, the third communications signal to each transmission link in the selected transmission links, to transmit the third communications signal to the RRU.

With reference to the fifth possible implementation manner of the fourth aspect of the embodiments, in a sixth possible implementation manner, the signal carrying capability includes a bandwidth capability; and the distributing, according to the signal carrying capabilities of the selected transmission links, the third communications signal to each transmission link in the selected transmission links, to transmit the third communications signal to the RRU includes: when a bandwidth of the third communications signal to be transmitted on each of the transmission links is not greater than a bandwidth capability of each of the transmission links, adjusting the bandwidth of the third communications signal to be transmitted on each of the transmission links to the bandwidth capability of the transmission link, and transmitting, to the RRU on each of the transmission links, the adjusted third communications signal to be transmitted.

With reference to the fifth possible implementation manner of the fourth aspect of the embodiments, or with reference to the sixth possible implementation manner of the fourth aspect of the embodiments, in a seventh possible implementation manner, the method further includes: transferring, to a second transmission link in the selected transmission links, the third communications signal borne on a first transmission link in the selected transmission links, to transmit the third communications signal to the RRU.

With reference to the seventh possible implementation manner of the fourth aspect of the embodiments, in an eighth possible implementation manner, the transferring, to a second transmission link in the selected transmission links, the third communications signal borne on a first transmission link in the selected transmission links, to transmit the third communications signal to the RRU includes: transferring, to the second transmission link according to the bandwidth capability of the second transmission link and a current bandwidth of the third communications signal transmitted on the first transmission link and on the second transmission link, all or a part of the third communications signal borne on the first transmission link, to transmit the third communications signal to the RRU.

With reference to the possible implementation manners of the fourth aspect of the embodiments, with reference to the first possible implementation manner of the fourth aspect of the embodiments, with reference to the second possible implementation manner of the fourth aspect of the embodiments, with reference to the third possible implementation manner of the fourth aspect of the embodiments, with reference to the fourth possible implementation manner of the fourth aspect of the embodiments, with reference to the fifth possible implementation manner of the fourth aspect of the embodiments, with reference to the sixth possible implementation manner of the fourth aspect of the embodiments, with reference to the seventh possible implementation manner of the fourth aspect of the embodiments, or with reference to the eighth possible implementation manner of the fourth aspect of the embodiments, in a ninth possible implementation manner, the method further includes: receiving a transmission link request message sent by the BBU, where the transmission link request message is used to request the first RHUB to report information about a connection between the first RHUB and an RHUB and/or an RRU; and determining, according to the transmission link request message, information about a first connection between the first RHUB and the second RHUB, and sending the determined information about the first connection to the BBU; and/or when the first RHUB is connected to at least one RRU, determining, according to the transmission link request message, information about a second connection between the first RHUB and the at least one RRU, and sending the determined information about the second connection to the BBU.

According to a fifth aspect of the embodiments, a signal transmission method is provided, including: receiving, by a second RHUB, a first communications signal sent by a first RHUB, where the first RHUB is connected to the second RHUB; and sending, by the second RHUB according to the received first communications signal, a second communications signal to an RRU connected to the second RHUB.

According to a sixth aspect of the embodiments, a RHUB is provided, including: an input port module, an output port module, and a processing module, where the output port module includes at least two output ports; the input port module is configured to connect to a BBU in a wired manner and receive a first communications signal sent by the BBU; the output port module is configured to connect to a same remote radio unit RRU by using transmission links connected to the at least two output ports; and the processing module is configured to send, according to the first communications signal received by the input port module, a second communications signal to the RRU by using the output port module.

With reference to possible implementation manners of the sixth aspect of the embodiments, in a first possible implementation manner, the processing module is specifically configured to: determine a network standard of the first communications signal received by the input port module; select, according to the network standard of the first communications signal and a preset correspondence between a network standard and the at least two output ports, an output port for outputting the second communications signal; and transmit the second communications signal to the RRU by using the selected output port.

With reference to the first possible implementation manner of the sixth aspect of the embodiments, in a second possible implementation manner, the processing module is further configured to: when the number of selected output ports is greater than or equal to 2, determine signal carrying capabilities of the transmission links connected to the selected output ports; and distribute, according to the signal carrying capabilities of the transmission links connected to the selected output ports, the second communications signal to each transmission link in the transmission links connected to the selected output ports, to transmit the second communications signal to the RRU.

With reference to the second possible implementation manner of the sixth aspect of the embodiments, in a third possible implementation manner, the signal carrying capability includes a bandwidth capability; and the processing module is specifically configured to: when a bandwidth of the second communications signal is not greater than a bandwidth capability of each of the transmission links, adjust the bandwidth of the second communications signal to the bandwidth capability of each of the transmission links, and transmit the adjusted second communications signal to the RRU on each of the transmission links.

With reference to the second possible implementation manner of the sixth aspect of the embodiments, or with reference to the third possible implementation manner of the sixth aspect of the embodiments, in a fourth possible implementation manner, the processing module is further configured to: transfer, to a second transmission link in the transmission links connected to the selected second output ports, the second communications signal borne on a first transmission link in the transmission links connected to the selected second output ports, to transmit the second communications signal to the RRU.

With reference to the fourth possible implementation manner of the sixth aspect of the embodiments, in a fifth possible implementation manner, the processing module is specifically configured to: transfer, to the second transmission link according to the bandwidth capability of the second transmission link and a current bandwidth of the second communications signal transmitted on the first transmission link and on the second transmission link, all or a part of the second communications signal borne on the first transmission link, to transmit the second communications signal to the RRU.

According to a seventh aspect of the embodiments, a signal transmission method is provided, where the method includes: receiving, by a first RHUB, a first communications signal sent by a BBU, where the first RHUB is connected to a same remote radio unit RRU by using at least two transmission links; and sending, by the first RHUB, a second communications signal to the RRU according to the received first communications signal.

With reference to possible implementation manners of the seventh aspect of the embodiments, in a first possible implementation manner, the sending, by the first RHUB, a second communications signal to the RRU according to the received first communications signal includes: determining a network standard of the first communications signal; selecting, from the at least two transmission links according to the network standard of the first communications signal and a preset correspondence between a network standard and the at least two transmission links, a transmission link for transmitting the second communications signal; and transmitting the second communications signal to the RRU by using the selected transmission link.

With reference to the first possible implementation manner of the seventh aspect of the embodiments, in a second possible implementation manner, the transmitting the second communications signal to the RRU by using the selected transmission link includes: when the number of selected transmission links is greater than or equal to 2, determining signal carrying capabilities of the selected transmission links; and distributing, according to the signal carrying capabilities of the selected transmission links, the second communications signal to each transmission link in the selected transmission links, to transmit the second communications signal to the RRU.

With reference to the second possible implementation manner of the seventh aspect of the embodiments, in a third possible implementation manner, the signal carrying capability includes a bandwidth capability; and the distributing, according to the signal carrying capabilities of the selected transmission links, the second communications signal to each transmission link in the selected transmission links, to transmit the second communications signal to the RRU includes: when a bandwidth of the second communications signal is not greater than a bandwidth capability of each of the transmission links, adjusting the bandwidth of the second communications signal to the bandwidth capability of each of the transmission links, and transmitting the second communications signal to the RRU on each of the transmission links.

With reference to the second possible implementation manner of the seventh aspect of the embodiments, or with reference to the third possible implementation manner of the seventh aspect of the embodiments, in a fourth possible implementation manner, the method further includes: transferring, to a second transmission link in the selected transmission links, a communications signal borne on a first transmission link in the selected transmission links, to transmit the communications signal to the RRU.

With reference to the fourth possible implementation manner of the seventh aspect of the embodiments, in a fifth possible implementation manner, the transferring, to a second transmission link in the selected transmission links, a communications signal borne on a first transmission link in the selected transmission links, to transmit the communications signal to the RRU includes: before transferring, to the second transmission link for transmission, the communications signal borne on the first transmission link, transferring, to the second transmission link according to the bandwidth capability of the second transmission link and a current bandwidth of the communications signal transmitted on the first transmission link and on the second transmission link, all or a part of the communications signal borne on the first transmission link, to transmit the communications signal to the RRU.

The embodiments of the embodiments provide a RHUB, including an input port module, a first output port module, and a processing module. The input port module is connected to a BBU in a wired manner and receives a first communications signal sent by the BBU; the first output port module is connected to another RHUB in a wired manner; and the processing module sends, according to the first communications signal received by the input port module, a second communications signal to the another RHUB by using the first output port module, thereby implementing cascading between different RHUBs, effectively expanding a signal coverage capacity of an indoor communications system, and improving reliability of the indoor communications system.

DETAILED DESCRIPTION OF ILLUSTRATIVE EMBODIMENTS

Embodiments provide a remote radio unit hub (RHUB), an indoor communications system, and a signal transmission method. The RHUB includes: an input port module, a first output port module, and a processing module, where the input port module is configured to connect to a baseband unit (BBU) in a wired manner and receive a first communications signal sent by the BBU; the first output port module is configured to connect to another RHUB in a wired manner; and the processing module is configured to send, according to the first communications signal received by the input port module, a second communications signal to the another RHUB by using the first output port module. In this way, the RHUB performs signal transmission with RHUBs at different levels by using the first output port module, thereby implementing cascading between different RHUBs, effectively expanding a signal coverage capacity of an indoor communications system, and improving reliability of the indoor communications system.

The following describes the embodiments in detail with reference to the accompanying drawings of the specification.

Embodiment 1

Figure 1:
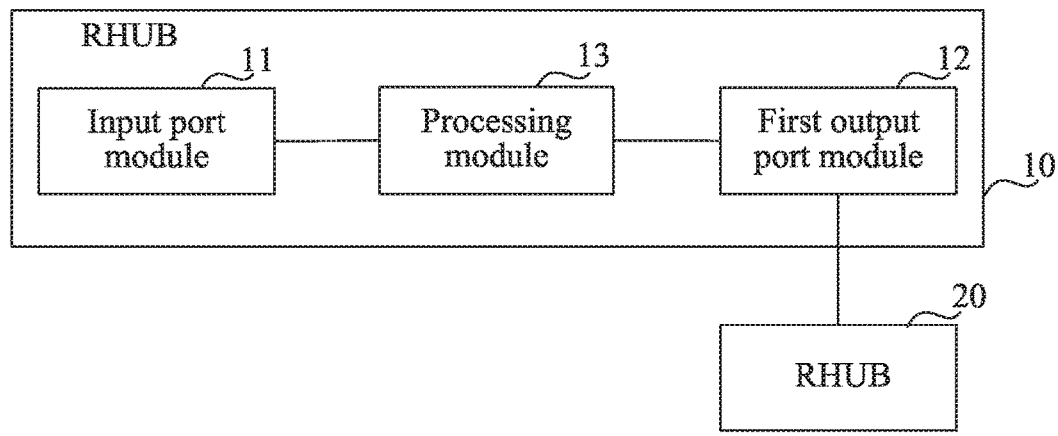
FIG. 1 is a schematic structural diagram of an RHUB according to Embodiment 1.

As shown in FIG. 1, FIG. 1 is a schematic structural diagram of a re RHUB 10 according to Embodiment 1. The RHUB 10 includes: an input port module 11, a first output port module 12, and a processing module 13, where the input port module 11 is configured to connect to a baseband unit (BBU) in a wired manner and receive a first communications signal sent by the BBU; the first output port module 12 is configured to connect to another RHUB 20 in a wired manner; and the processing module 13 is configured to send, according to the first communications signal received by the input port module 11, a second communications signal to the another RHUB 20 by using the first output port module 12.

Specifically, the input port module 11 may be connected to the BBU in a direct connection manner by using a fiber, which, for example, may be a common public radio interface (CPRI) link; in this way, a requirement for a transmission link is effectively ensured when a communications signal is transmitted between the BBU and the RHUB.

The first communications signal and the second communications signal may be the same or may be different, which is not limited herein. Specifically, the second communications signal may be obtained by performing simple processing on the first communications signal. For example, an information frame in the second communications signal may be obtained by deleting an information element in an information frame in the first communications signal.

Optionally, the first communications signal may include identification information used to indicate a destination address of the communications signal. The processing module 13 is specifically configured to determine, according to the identification information, whether the destination address of the first communications signal is the another RHUB; and if yes, send, according to the first communications signal, the second communications signal to the another RHUB by using the first output port module 12.

Optionally, the first output port module 12 is specifically configured to connect to the another RHUB by using a common public radio interface (CPRI) link.

That is, an RHUB implements cascading to another RHUB by using a first output port, and forwards a communications signal received from a baseband unit (BBU) to the another RHUB, thereby expanding a signal capacity of a system.

Optionally, the input port module 11 is further configured to receive a transmission link request message sent by the BBU, where the transmission link request message is used to request the RHUB to report information about a connection between the RHUB and an RHUB and/or a radio resource unit (RRU); and the processing module 13 is further configured to determine, according to the transmission link request message received by the input port module 11, information about a first connection between the first output port module and the another RHUB, and send the information about the first connection to the BBU; and/or if the RHUB further includes a second output port module 14, and the second output port module 14 is connected to at least one RRU, determine, according to the transmission link request message, information about a second connection between the at least one RRU connected to the second output port module 14 and the second output port module 14, and send the information about the second connection to the BBU.

The RHUB provided by this embodiment includes an input port module, a first output port module, and a processing module, where the input port module is connected to a BBU in a wired manner and receives a first communications signal sent by the BBU; the first output port module is connected to another RHUB in a wired manner; and the processing module sends, according to the first communications signal received by the input port module, a second communications signal to the another RHUB by using the first output port module. In this way, the RHUB performs signal transmission with RHUBs at different levels by using the first output port module, thereby implementing cascading between different RHUBs, effectively expanding a signal coverage capacity of an indoor communications system, and improving reliability of the indoor communications system.

Figure 2:
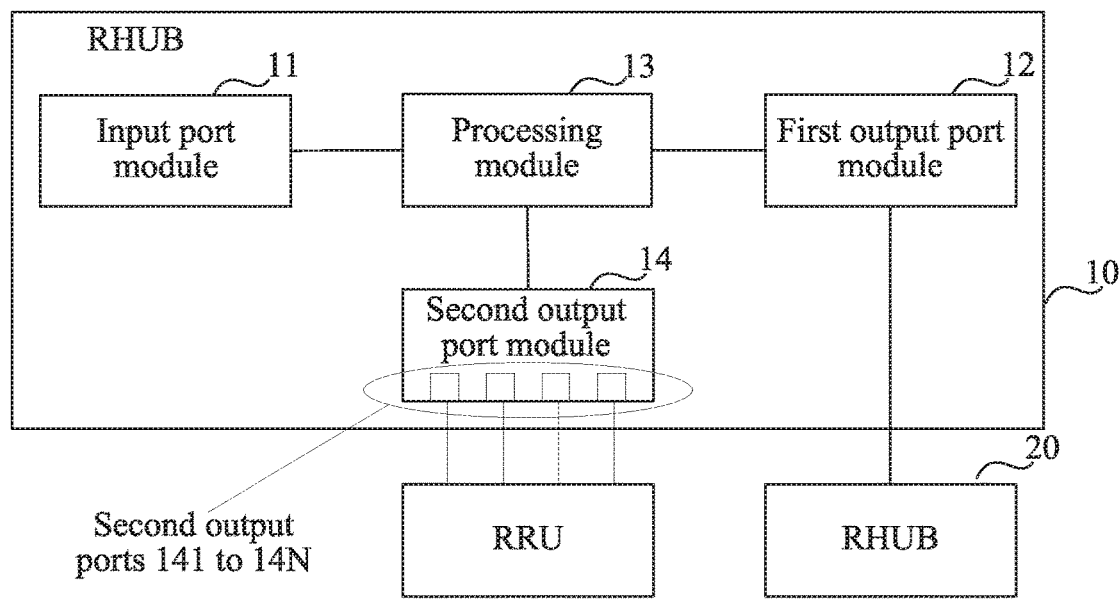
FIG. 2 is a schematic structural diagram of cascading among multiple RHUBs.

Optionally, in an implementation scenario of this embodiment, as shown in FIG. 2, the RHUB further includes: a second output port module 14, where the second output port module 14 is configured to connect to a remote radio unit RRU in a wired manner.

It should be noted that the second output port module 14 may specifically be a network cable interface, and the wired manner may specifically be a connection by using a network cable. In addition to a function of transmitting a communications signal, a network cable is further used to supply power to the RRU.

Further, the processing module 13 is further configured to: send, according to the first communications signal received by the input port module, a third communications signal to the RRU by using the second output port module 14; or when the first communications signal includes the identification information used to indicate the destination address of the first communications signal, and the destination address, indicated by the identification information, of the first communications signal is the RRU, send, according to the first communications signal, a third communications signal to the RRU by using the second output port module.

The first communications signal and the third communications signal may be the same or may be different, which is not limited herein. Specifically, the third communications signal may be obtained by performing simple processing on the first communications signal. For example, an information frame in the third communications signal may be obtained by deleting an information element in an information frame in the first communications signal.

Optionally, the second output port module 14 includes at least two second output ports, and the at least two second output ports may be represented by 141 to 14N, where N is an integer not less than 2.

The second output port module 14 is specifically configured to connect to the same RRU by using transmission links connected to the at least two second output ports.

Specifically, the transmission links connected to the at least two second output ports may be network cables, or may be CPRIs, which is not specifically limited.

Specifically, a manner of connecting the second output port module 14 and the RRU may be described by using examples below.

Figure 3:
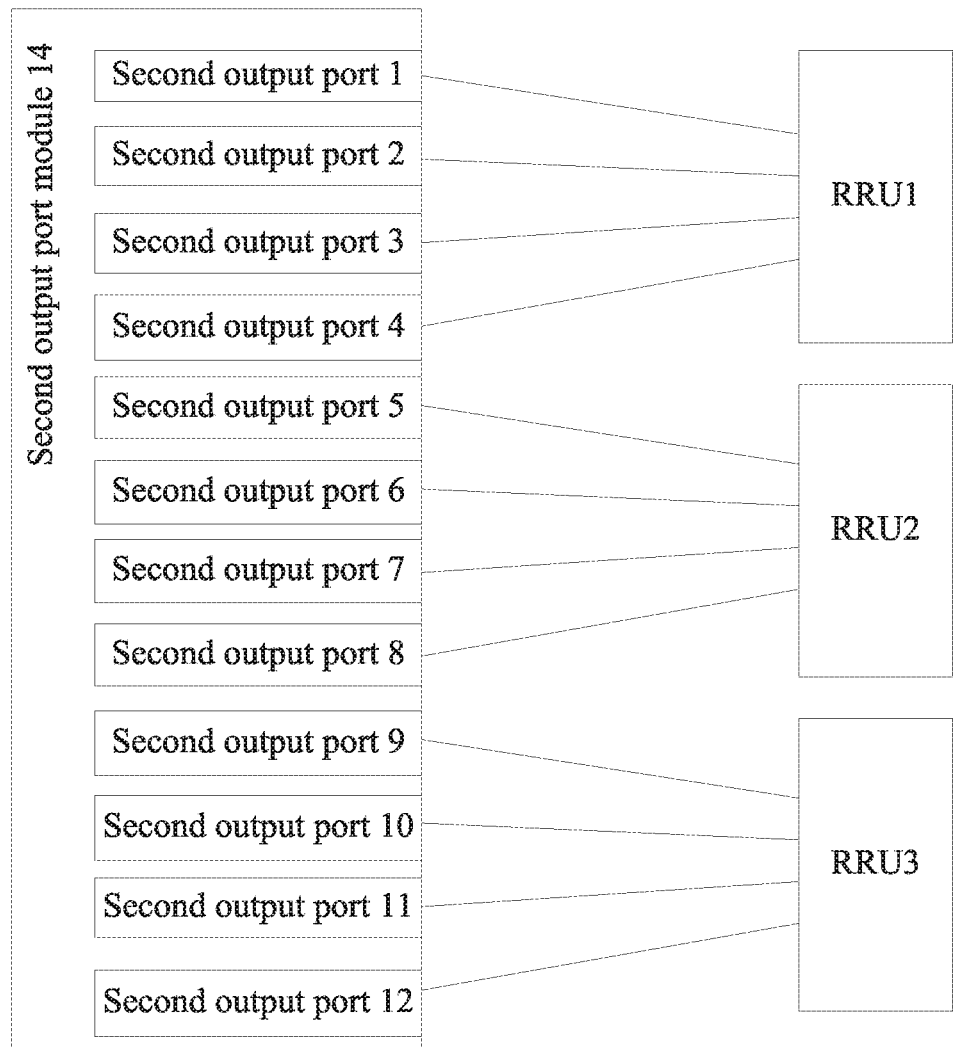
FIG. 3 is a schematic structural diagram in which at least two second output ports included in a second output port module of an RHUB are connected to a same RRU.

As shown in FIG. 3, FIG. 3 is a schematic structural diagram in which at least two second output ports included in a second output port module 14 of an RHUB are connected to a same RRU.

It can be seen from FIG. 3 that, assuming that the second output port module 14 of the RHUB includes 12 second output ports, that is, N=12, the 12 second output ports included in the second output port module of the RHUB are grouped, where second output ports 1 to 4 are connected to an RRU 1 by using network cables, second output ports 5 to 8 are connected to an RRU 2 by using network cables, and second output ports 9 to 12 are connected to an RRU 3 by using network cables.

Figure 4:
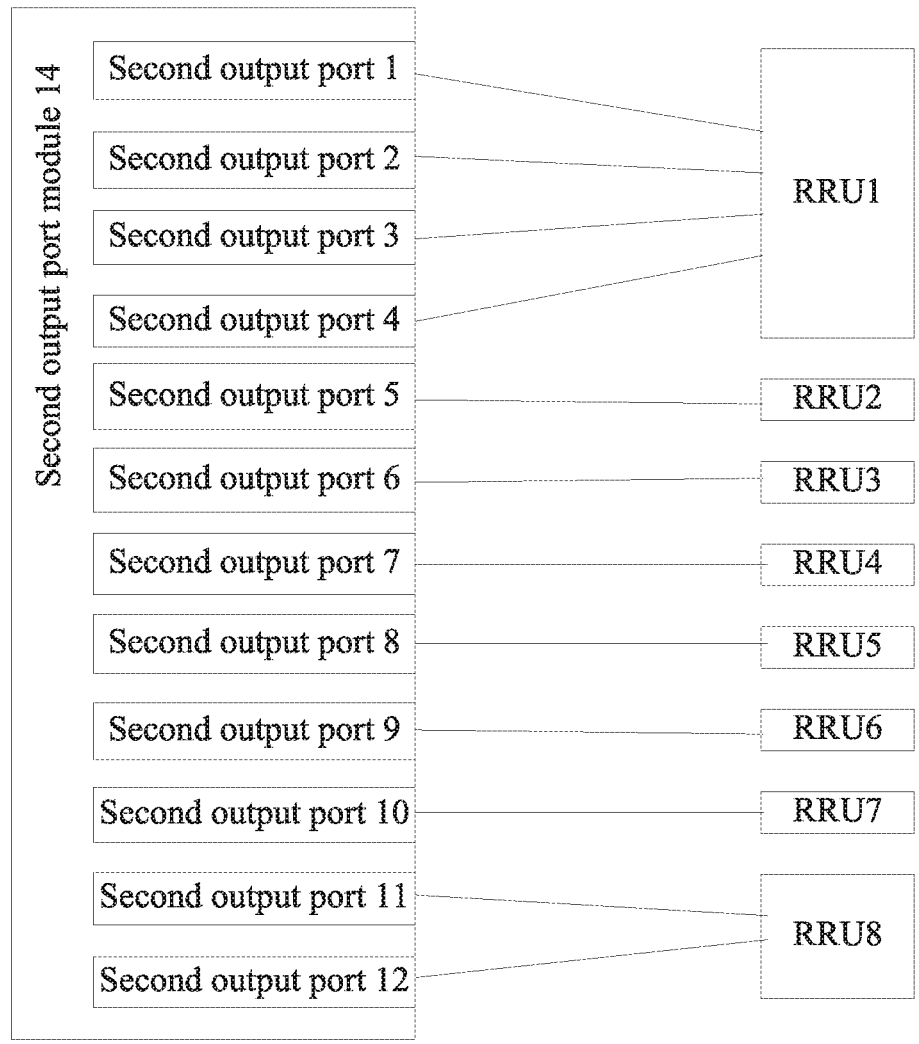
FIG. 4 is a schematic structural diagram in which at least two second output ports included in a second output port module of an RHUB are connected to a same RRU.

As shown in FIG. 4, FIG. 4 is a schematic structural diagram in which at least two second output ports included in a second output port module of an RHUB are connected to a same RRU.

It can be seen from FIG. 4 that, assuming that the second output port module of the RHUB includes 12 second output ports, the 12 second output ports included in the second output port module of the RHUB are grouped, where second output ports 1 to 4 are connected to the RRU 1 by using network cables, a second output port 5 is connected to the RRU 2 by using a network cable, a second output port 6 is connected to the RRU 3 by using a network cable, a second output port 7 is connected to an RRU 4 by using a network cable, a second output port 8 is connected to an RRU 5 by using a network cable, a second output port 9 is connected to an RRU 6 by using a network cable, a second output port 10 is connected to an RRU 7 by using a network cable, a second output port 10 is connected to an RRU 8 by using a network cable, and second output ports 11 to 12 are connected to an RRU 8 by using network cables.

Further optionally, the processing module 13 is specifically configured to: determine a network standard of the first communications signal received by the input port module 11; select, according to the network standard of the first communications signal and a preset correspondence between a network standard and the at least two second output ports, a second output port for outputting the third communications signal; and transmit the third communications signal to the RRU by using the selected second output port. It should be noted that the first communications signal received by the input port module 11 may be a communications signal supporting a single standard, or may be a communications signal supporting multiple standards, which is not limited herein.

For example, the network standard of the first communications signal includes but is not limited to: a GSM (Global System for Mobile Communications) system network standard, a TD-SCDMA (time division synchronization) system network standard, a CDMA (Code Division Multiple Access) system network standard, a WCDMA (wideband code division multiple access) system network standard, a CDMA2000 (Code Division Multiple Addressing 2000) system network standard, a TD-LTE (Time Division Long Term Evolution) system network standard, a UMTS (Universal Mobile Telecommunications System) network standard, and the like.

For example, when the received first communications signal includes a communications signal 1 supporting a UTMS network standard and a communications signal 2 supporting an LTE network standard, the processing module 13 determines the network standard UTMS supported by the received communications signal 1, and sends, according to a preset correspondence between a network standard UTMS and the second output port 2, the communications signal 1 to the RRU by using the second output port 2; and also determines the network standard LTE supported by the received communications signal 2, and sends, according to a preset correspondence between a network standard LTE and the second output port 4, the communications signal 2 to the RRU by using the second output port 4. The preset correspondence between the network standard and the at least two second output ports may be preconfigured for the RHUB by using an input device, or the correspondence may be obtained by classifying, by the RHUB according to the network standard supported by the first communications signal, the second output ports included in the second output port module. For example, when the second output port module 12 includes 12 second output ports, and there are three network standards of the first communications signal, each type of network standard may correspond to four second output ports.

It should be noted that when the second output ports included in the second output port module 14 are classified, there is a situation in which some second output ports support only one network standard, and a situation in which some second output ports support multiple network standards. Therefore, a second output port supporting only one network standard may be used as a dedicated output port of a communications signal supporting the network standard; and a second output port supporting multiple network standards may be used by a communications signal supporting only one network standard and may also be used as a dedicated transmission port of a communications signal simultaneously supporting multiple network standards, which is not limited herein.

For example, a second output port used to output a communications signal supporting only a GSM network standard is the second output port 1, and then the second output port 1 is used as a dedicated output port for outputting a communications signal supporting only the GSM network standard, and the second output port 1 is preferably used as an output port provided that a network standard supported by a communications signal that is sent by a BBU and that is received by an input port is the GSM network standard; a second output port used to output a communications signal supporting both a UTMS network standard and a TD-LTE network standard is the second output port 3, and then the second output port 3 may be used as a dedicated output port for outputting a communications signal supporting both the UTMS network standard and the TD-LTE network standard, and may also be used as a port for outputting a communications signal supporting only the UTMS network standard or a communications signal supporting only the TD-LTE network standard, which is not limited herein.

Further, the processing module 13 is further configured to: when the number of selected second output ports is greater than or equal to 2, determine signal carrying capabilities of the transmission links connected to the selected second output ports; and distribute, according to the signal carrying capabilities, the third communications signal to each transmission link in the transmission links connected to the selected second output ports, to transmit the third communications signal to the RRU.

Assuming that the received first communications signal is the communications signal 1 supporting the UTMS network standard, the selected second output ports are separately the second output port 2 and the second output port 3; in this case, a signal carrying capability of a transmission link connected to the second output port 2 and a signal carrying capability of a transmission link connected to the second output port 3 are determined, and according to the signal carrying capability of the transmission link connected to the second output port 2 and the signal carrying capability of the transmission link connected to the second output port 3, the communications signal 1 is distributed to the transmission link connected to the second output port 2, to be transmitted to the RRU, and the communications signal 1 is distributed to the transmission link connected to the second output port 3, to be transmitted to the RRU.

Optionally, the signal carrying capability includes a bandwidth capability, and the processing module 13 is specifically configured to: when a bandwidth of the third communications signal to be transmitted on each of the transmission links is not greater than a bandwidth capability of each of the transmission links, adjust the bandwidth of the third communications signal to be transmitted on each of the transmission links to the bandwidth capability of each of the transmission links, and transmit the adjusted third communications signal to the RRU on each of the transmission links.

Still using the foregoing case as an example, when the bandwidth capability of the transmission link connected to the second output port 2 is less than a bandwidth of the communications signal 1, the bandwidth of the communications signal 1 is adjusted to the bandwidth capability of the transmission link connected to the second output port 2, and the communications signal 1 is transmitted to the RRU by using the transmission link connected to the second output port 2; when the bandwidth capability of the transmission link connected to the second output port 2 is greater than the bandwidth of the communications signal 1, the communications signal 1 is transmitted to the RRU according to the bandwidth of communications signal 1 by using the transmission link connected to the second output port 2.

Optionally, the processing module 13 is further configured to transfer, to a second transmission link in the transmission links connected to the selected second output ports, the third communications signal borne on a first transmission link in the transmission links connected to the selected second output ports, to transmit the third communications signal to the RRU.

Still using the foregoing case as an example, when communications signals are transmitted between the RHUB and the RRU by using the transmission link connected to the second output port 2 of the second output port module and the transmission link connected to the second output port 3 of the second output port module, the communications signal borne on the transmission link connected to the second output port 2 may be transferred to the transmission link connected to the second output port 3, to be transmitted to the RRU; or the communications signal borne on the transmission link connected to the second output port 3 may be transferred to the transmission link connected to the second output port 2, to be transmitted to the RRU.

Optionally, the processing module 13 is specifically configured to: before transferring, to the second transmission link for transmission, the third communications signal borne on the first transmission link, transfer, to the second transmission link according to a bandwidth capability of the second transmission link and a current bandwidth of the third communications signal transmitted on the first transmission link and on the second transmission link, all or a part of the third communications signal borne on the first transmission link, to transmit the third communications signal to the RRU.

That is, when a current surplus bandwidth of the second transmission link is greater than a bandwidth of a communications signal borne on and transmitted on the first transmission link, all of the communications signal borne on the first transmission link is transferred to the second transmission link, to be transmitted to the RRU; and when the current surplus bandwidth of the second transmission link is not greater than the bandwidth of the communications signal borne on and transmitted on the first transmission link, a part of the communications signal borne on the first transmission link is transferred to the second transmission link, to be transmitted to the RRU. The surplus bandwidth of the second transmission link is a difference between the bandwidth capability of the second transmission link and a bandwidth of the communications signal currently borne on the second transmission link. It should be noted that in this embodiment, a signal carrying capability of a transmission link is not limited to being represented by using a bandwidth, and may also be represented by using a transmission rate, which is not limited herein.

In this way, although an access capacity of an indoor signal is reduced, indoor signal coverage is ensured.

Optionally, when a fault occurs in a transmission link, a basis for selecting a transmission link may include but is not limited to the following rule: a second output port supporting transmission of the communications signal is preferably selected, and then a transmission link, which has a strong signal carrying capability, of the second output port is selected, which is not further limited herein.

Embodiment 2

Figure 5:
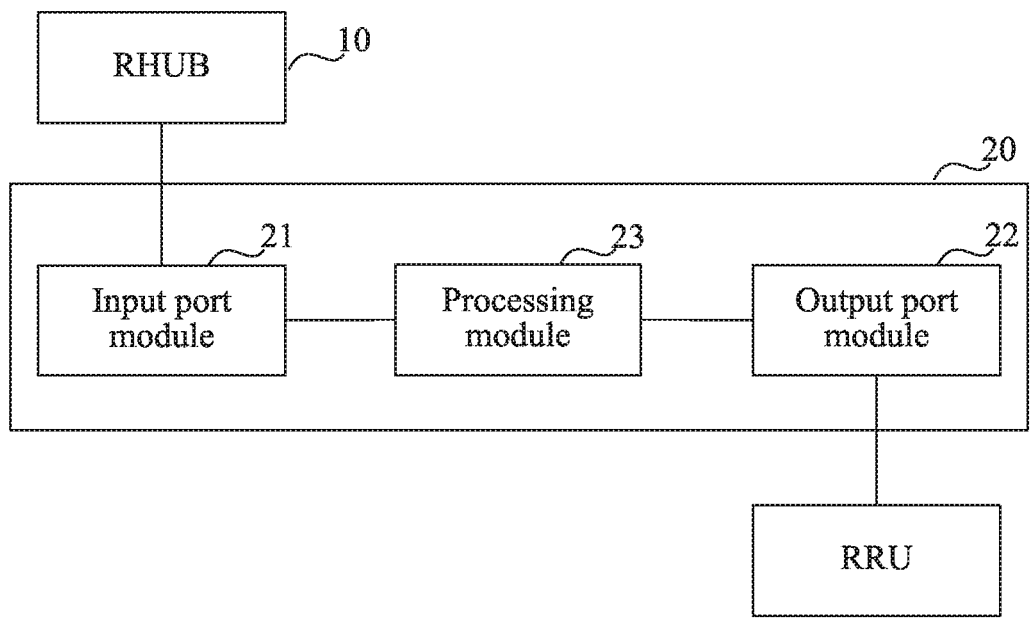
FIG. 5 is a schematic structural diagram of an RHUB according to Embodiment 2.

As shown in FIG. 5, FIG. 5 is a schematic structural diagram of a RHUB according to Embodiment 2. Embodiment 2 has a similar concept to Embodiment 1. The RHUB described in Embodiment 2 is the another RHUB 20 mentioned in Embodiment 1 of and includes: an input port module 21, an output port module 22, and a processing module 23.

The input port module 21 is configured to connect to a first RHUB 10 in a wired manner and receive a first communications signal sent by the first RHUB.

It should be noted that the input port module 21 is connected, by using a network cable, to the RHUB provided by Embodiment 1, and receives the first communications signal sent by the RHUB provided by Embodiment 1.

The output port module 22 is configured to connect to a remote radio unit RRU in a wired manner.

Specifically, the output port module 22 may be connected to the RRU by using a network cable or a CPRI link, which is not limited herein.

The processing module 23 is configured to send, according to the first communications signal received by the input port module 21, a second communications signal to the RRU by using the output port module 22.

Embodiment 3

Figure 6:
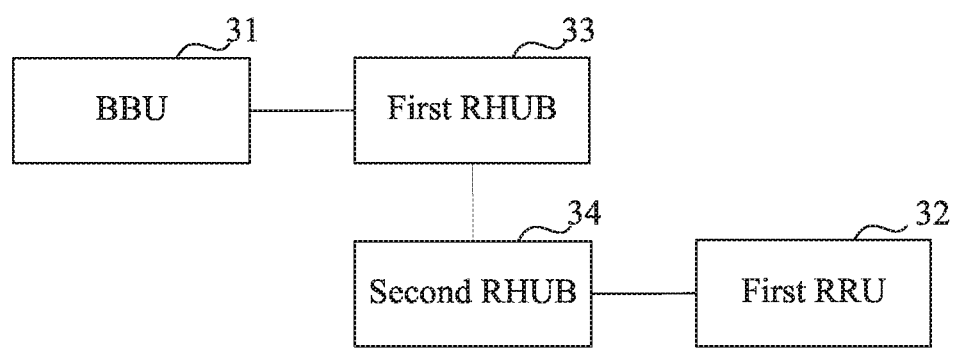
FIG. 6 is a schematic structural diagram of an indoor communications system according to Embodiment 3.

As shown in FIG. 6, FIG. 6 is a schematic structural diagram of an indoor communications system according to Embodiment 3. Embodiment 3 has a similar concept to Embodiment 1 and Embodiment 2. The indoor communications system includes: a BBU 31, a first remote radio unit RRU 32, a first RHUB 33, and a second RHUB 34, where the first RHUB 33 is configured to connect to the BBU 31 and receive a first communications signal sent by the BBU 31; the first RHUB 33 is further configured to connect to the second RHUB 34, and send a second communications signal to the second RHUB 34 according to the first communications signal; the second RHUB 34 is configured to connect to the first RHUB 33 and the first RRU 32, and receive the second communications signal sent by the first RHUB 33; and the first RHUB 33 is the RHUB in the embodiment shown in FIG. 1, and the second RHUB 34 is the RHUB in the embodiment shown in FIG. 5.

Optionally, the indoor communications system further includes a second RRU, and the first RHUB 33 is further configured to connect to the second RRU.

Optionally, the indoor communications system further includes a DCU (Digital Conversion Unit, digital conversion unit) 35 and a third RRU 36, where the first RHUB 33 is specifically configured to connect to the BBU 31 by using the DCU 35, and receive, by using the DCU 35, the first communications signal sent by the BBU 31, where the first communications signal is a digital signal; the third RRU 36 is configured to connect to the DCU 35 in a wired manner; and the DCU 35 is configured to connect the third RRU 36, the BBU 31, and the first RHUB 33, and receive a third communications signal sent by the third RRU 36, where the third communications signal is a radio frequency signal; and convert the received third communications signal into a digital signal and multiplex the digital signal and the first communications signal on a same transmission link, to send the digital signal and the first communications signal to the first RHUB 33.

Figure 7:
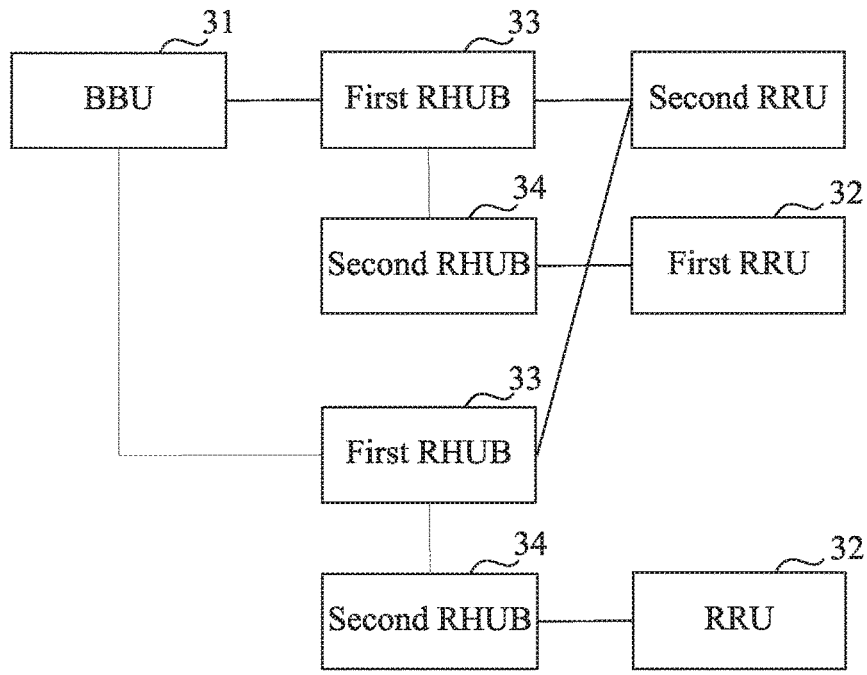
FIG. 7 is a schematic structural diagram of an indoor communications system.

It should be noted that there may be multiple first RHUBs in the indoor communications system. As shown in FIG. 7, FIG. 7 is a schematic structural diagram of an indoor communications system. It can be seen from FIG. 7 that, assuming there are two first RHUBs, each first RHUB is configured to connect to at least one second RHUB 34 and connect to the BBU 31, where the second RHUB 34 is configured to connect to at least one RRU 321; and each first RHUB 33 is configured to connect to at least one RRU 322.

It should be noted that at least two of the first RHUBs 33 are specifically configured to connect to a same RRU.

It can be further seen from FIG. 7 that, among multiple RHUBs at a first level connected to a same RRU, when a fault occurs in one RHUB at the first level, other RHUBs at the first level may further transmit, to the RRU, a communications signal from a BBU, which meets a requirement for indoor signal coverage, thereby effectively improving reliability of the indoor communications system.

In addition, among the multiple first RHUBs connected to the same RRU, second output port modules of each first RHUB are connected to the same RRU. However, network standards of communications signals transmitted on transmission links connected to the second output port modules of each first RHUB may be different.

For example, a first RHUB 1 is connected to an RRU 1 and a first RHUB 2 is connected to the RRU 1, it is internally preset that when receiving a UTMS signal, the first RHUB 1 transmits the UTMS signal to the RRU 1 by using a transmission link connected to a second output port module of the first RHUB 1, and it is internally preset that when receiving an LTE signal, the first RHUB 2 transmits the LTE signal to the RRU 1 by using a transmission link connected to a second output port module of the first RHUB 2. In this case, the first RHUB 1 and the first RHUB 2 receive a communications signal 1 from a BBU. When the communications signal 1 supports a UTMS network standard, the communications signal 1 is transmitted to the RRU 1 by using the transmission link connected to the second output port module of the first RHUB 1; when the communications signal 1 supports an LTE network standard, the communications signal 1 is transmitted to the RRU 1 by using the transmission link connected to the second output port module of the first RHUB 2; and when the communications signal 1 supports both the UTMS network standard and the LTE network standard, the communications signal 1 is distributed, according to a signal carrying capability of the transmission link connected to the second output port module of the first RHUB 2 and a signal carrying capability of the transmission link connected to the second output port module of the first RHUB 1, to the transmission link connected to the second output port module of the first RHUB 2 and the transmission link connected to the second output port module of the first RHUB 1, to be transmitted to the RRU 1.

It should be noted that for a manner of distributing a communications signal, distribution may be performed according to the manner described in Embodiment 1, which is not specifically limited herein.

It should be further noted that the multiple RHUBs connected to the same RRU are not limited to being connected to a same BBU, and may further be connected to different BBUs, which is not limited herein.

Figure 8:
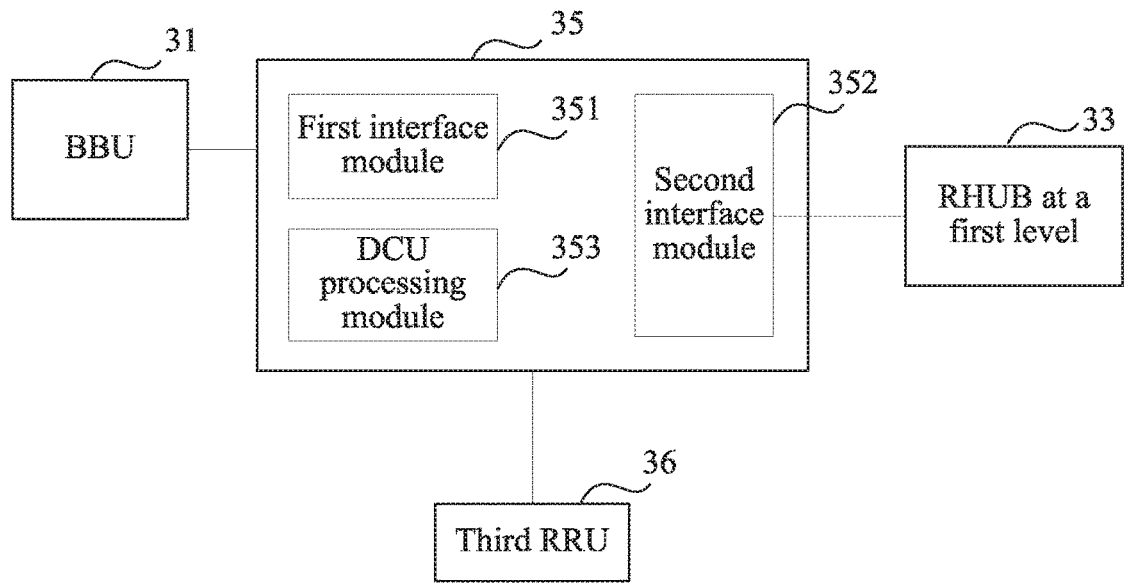
FIG. 8 is a schematic structural diagram of a digital conversion unit DCU.

As shown in FIG. 8, FIG. 8 is a schematic structural diagram of a digital conversion unit DCU provided by this embodiment. A digital conversion unit DCU 35 provided by this embodiment includes: a first interface module 351, a second interface module 352, a third interface module 353, and a DCU processing module 354, where the first interface module 351 is configured to connect to the BBU 31; the second interface module 352 is configured to connect to the RHUB 33 at the first level; the third interface module 353 is configured to connect to the third RRU 36; and the DCU processing module 354 is configured to: when the BBU 31 includes at least two BBUs and when the second interface module 352 receives a radio frequency signal sent by the first RHUB 33, determine a target BBU corresponding to the radio frequency signal, convert the radio frequency signal into a digital signal, and send the digital signal to the target BBU by using the first interface module 351; and/or when the first interface module 351 receives a digital signal sent by the BBU 31 and when the third interface module 353 receives a radio frequency signal sent by the third RRU 36, convert the radio frequency signal into a digital signal, and then multiplex the digital signal that is sent by the BBU 31 and the digital signal on a same transmission link, to send the digital signal that is sent by the BBU 31 and the digital signal to the first RHUB 33.

It can be seen that, by using the RHUB, the BBU, the RRU, and the DCU in this embodiment, multiple forms of indoor communications systems may be constructed, which are not listed herein. However, modules with the structures or the functions described in this embodiment shall fall within the ideas.

According to the indoor communications system provided by this embodiment, first, a cascading manner is used for RHUBs at different levels in the indoor communications system, thereby effectively expanding a signal coverage capacity of the indoor communications system and improving reliability of the indoor communications system; in addition, a DCU is added between an RHUB and a BBU in the indoor communications system, so that the indoor communications system can implement centralized management on radio frequency resources; and further, hybrid networking between an RRU and a BBU that are produced in different networks is implemented by using the DCU, thereby improving reliability of the indoor communications system.

Embodiment 4

Figure 9:
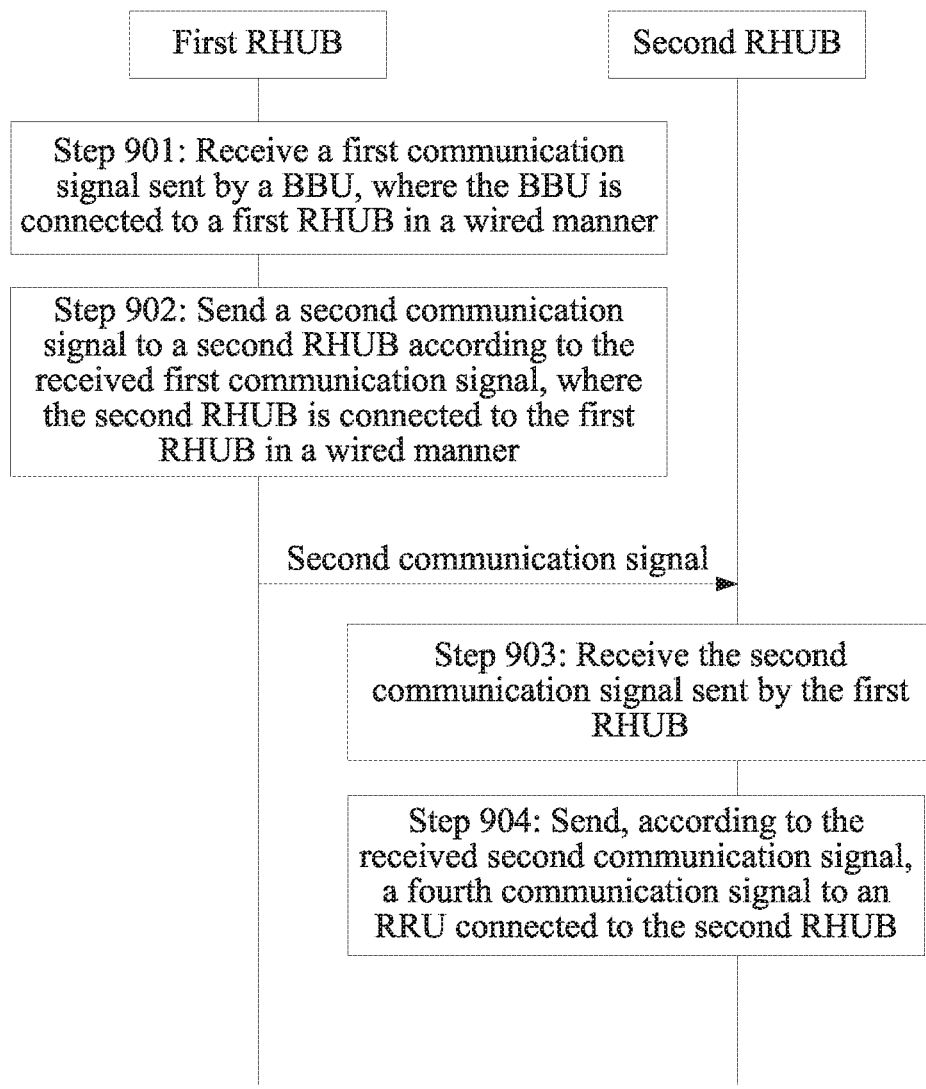
FIG. 9 is a schematic flowchart of a signal transmission method according to Embodiment 4.

As shown in FIG. 9, FIG. 9 is a schematic flowchart of a signal transmission method according to Embodiment 4. Embodiment 4 has a similar concept to Embodiment 1 to Embodiment 3. The method may be as described below.

Step 901: A first RHUB receives a first communications signal sent by a BBU, where the BBU is connected to the first RHUB in a wired manner.

The first communications signal may include identification information used to indicate a destination address of the first communications signal.

Step 902: The first RHUB sends a second communications signal to a second RHUB according to the received first communications signal, where the second RHUB is connected to the first RHUB in a wired manner.

The first communications signal and the second communications signal may be the same or may be different, which is not limited herein. Specifically, the second communications signal may be obtained by performing simple processing on the first communications signal. For example, an information frame in the second communications signal may be obtained by deleting an information element in an information frame in the first communications signal.

Step 903: The second RHUB receives the second communications signal sent by the first RHUB.

Step 904: The second RHUB sends, according to the received second communications signal, a fourth communications signal to an RRU connected to the second RHUB.

The second communications signal and the fourth communications signal may be the same or may be different, which is not limited herein. Optionally, in step 902, when the first communications signal includes the identification information used to indicate the destination address of the first communications signal, whether the destination address of the first communications signal is the second RHUB is determined according to the identification information, and if yes, the second communications signal is transmitted to the second RHUB.

According to the signal transmission method provided by this embodiment, a first RHUB receives a first communications signal sent by a BBU, where the BBU is connected to the first RHUB in a wired manner; the first RHUB sends a second communications signal to a second RHUB according to the received first communications signal, where the second RHUB is connected to the first RHUB in a wired manner; and the second RHUB receives the second communications signal sent by the first RHUB, and sends, according to the received second communications signal, a fourth communications signal to an RRU connected to the second RHUB. The signal transmission method implements cascading between different RHUBs, effectively expands a signal coverage capacity of an indoor communications system, and improves reliability of the indoor communications system.

In an implementation scenario of this embodiment, the method further includes:

Step 905: Send a third communications signal to the RRU according to the received first communications signal, where the RRU is connected to the first RHUB.

The first communications signal and the third communications signal may be the same or may be different, which is not limited herein.

It should be noted that in an implementation manner, the first communications signal includes the identification information used to indicate the destination address of the communications signal, and step 905 may include: determining, according to the identification information, whether the destination address of the first communications signal is the RRU, and if yes, transmitting the third communications signal to the RRU.

In another implementation manner, the first RHUB and the RRU are connected by using at least two transmission links, and step 905 may include: determining a network standard of the first communications signal; selecting, from the at least two transmission links according to the network standard of the first communications signal and a preset correspondence between a network standard and the at least two transmission links, a transmission link for transmitting the third communications signal; and transmitting the third communications signal to the RRU by using the selected transmission link.

The preset correspondence between the network standard and the at least two transmission links may be preset in an RHUB, or may be determined by an RHUB according to a network standard of a received communications signal. For example, a correspondence between an output port of an RHUB and a network standard may be used to represent a correspondence between the network standard and the at least two transmission links, where the two correspondences may be equivalent. For the correspondence between the output port of the RHUB and the network standard, reference may be made to the embodiment shown in FIG. 1, and details are not described herein again.

The transmitting the third communications signal to the RRU by using the selected transmission link may include: when the number of selected transmission links for transmitting the third communications signal is greater than or equal to 2, determining signal carrying capabilities of the selected transmission links; and distributing, according to the signal carrying capabilities of the selected transmission links, the third communications signal to each transmission link in the selected transmission links, to transmit the third communications signal to the RRU.

When the signal carrying capability includes a bandwidth capability, the distributing, according to the signal carrying capabilities of the selected transmission links, the third communications signal to each transmission link in the selected transmission links, to transmit the third communications signal to the RRU includes: when a bandwidth of the third communications signal to be transmitted on each of the transmission links is not greater than a bandwidth capability of each of the transmission links, adjusting the bandwidth of the third communications signal to be transmitted on each of the transmission links to the bandwidth capability of the transmission link, and transmitting, to the RRU on each of the transmission links, the adjusted third communications signal to be transmitted.

Optionally, the foregoing method further includes: transferring, to a second transmission link in the selected transmission links, the third communications signal borne on a first transmission link in the selected transmission links, to transmit the third communications signal to the RRU.

The transferring, to a second transmission link in the selected transmission links, the third communications signal borne on a first transmission link in the selected transmission links, to transmit the third communications signal to the RRU may include: transferring, to the second transmission link according to the bandwidth capability of the second transmission link and a current bandwidth of the third communications signal transmitted on the first transmission link and on the second transmission link, all or a part of the third communications signal borne on the first transmission link, to transmit the third communications signal to the RRU.

In another implementation scenario of this embodiment, the method further includes: receiving a transmission link request message sent by the BBU, where the transmission link request message is used to request the first RHUB to report information about a connection between the first RHUB and an RHUB and/or an RRU; and determining, according to the transmission link request message, information about a first connection between the first RHUB and the second RHUB, and sending the determined information about the first connection to the BBU; and/or when the first RHUB is connected to at least one RRU, determining, according to the transmission link request message, information about a second connection between the first RHUB and the at least one RRU, and sending the determined information about the second connection to the BBU.

According to the signal transmission method provided by this, because multiple transmission links are established between an RHUB and an RRU, a received communications signal is transmitted to the RRU by using different transmission links according to a network standard supported by each transmission link, thereby implementing transmission of a multi-standard signal; in addition, because the multiple transmission links are established between the RHUB and the RRU, a problem of communication interruption due to a fault that occurs in a single transmission link between the RHUB and the RRU is avoided; and further, load balancing can be implemented among different transmission links between the RHUB and the RRU according to load conditions of the different transmission links, thereby effectively ensuring reliability of communications signal transmission between the RHUB and the RRU.

Embodiment 5

Figure 10:
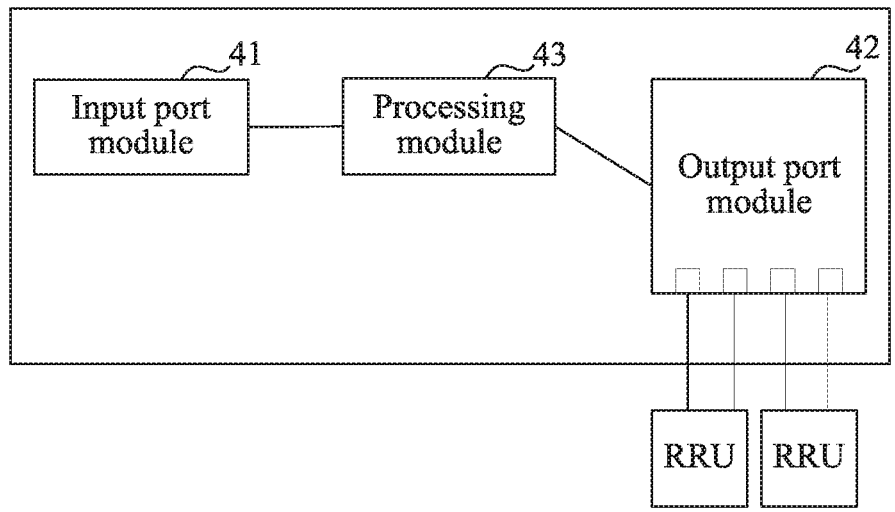
FIG. 10 is a schematic structural diagram of an RHUB according to Embodiment 5.

As shown in FIG. 10, FIG. 10 is a schematic structural diagram of a RHUB according to Embodiment 5. Embodiment 5 has a similar concept to Embodiment 1 and Embodiment 4. The RHUB includes: an input port module 41, an output port module 42, and a processing module 43, where the output port module 42 includes at least two output ports.

The input port module 41 is configured to connect to a BBU in a wired manner and receive a first communications signal sent by the BBU.

It should be noted that the input port module 41 may be connected to the BBU in a direct connection manner by using a fiber; in this way a requirement for a transmission link is effectively ensured when a communications signal is transmitted between a BBU and an RHUB, where the fiber may specifically be a CPRI link.

The output port module 42 is configured to connect to a same remote radio unit RRU by using transmission links connected to the at least two output ports.

The processing module 43 is configured to send, according to the first communications signal received by the input port module 41, a second communications signal to the RRU by using the output port module 42.

The processing module 43 is specifically configured to: determine a network standard of the first communications signal received by the input port module 41; select, according to the network standard of the first communications signal and a preset correspondence between a network standard and the at least two output ports, an output port for outputting the second communications signal; and transmit the second communications signal to the RRU by using the selected output port.

For related descriptions of the preset correspondence between the network standard and the at least two output ports, reference may be made to the embodiment shown in FIG. 1, and details are not described herein again.

Optionally, the processing module 43 is further configured to: when the number of selected output ports is greater than or equal to 2, determine signal carrying capabilities of the transmission links connected to the selected output ports; and distribute, according to the signal carrying capabilities of the transmission links connected to the selected output ports, the second communications signal to each transmission link in the transmission links connected to the selected output ports, to transmit the second communications signal to the RRU.

Further, the signal carrying capability may include a bandwidth capability, and the processing module 43 is specifically configured to: when a bandwidth of the second communications signal is not greater than a bandwidth capability of each of the transmission links, adjust the bandwidth of the second communications signal to the bandwidth capability of each of the transmission links, and transmit the adjusted second communications signal to the RRU on each of the transmission links.

Further optionally, the processing module 43 is further configured to: transfer, to a second transmission link in the transmission links connected to the selected second output ports, the second communications signal borne on a first transmission link in the transmission links connected to the selected second output ports, to transmit the second communications signal to the RRU.

It should be noted that the processing module 43 may be specifically configured to: transfer, to the second transmission link according to the bandwidth capability of the second transmission link and a current bandwidth of the second communications signal transmitted on the first transmission link and on the second transmission link, all or a part of the second communications signal borne on the first transmission link, to transmit the second communications signal to the RRU. It should be noted that functions of the output port described in Embodiment 5 are the same as those of the second output port described in Embodiment 1, and details are not described herein again.

According to the RHUB provided by this embodiment, the RHUB includes an input port module, an output port module, and a processing module, where the output port module includes at least two output ports; the input port module is configured to connect to a BBU in a wired manner and receive a first communications signal sent by the BBU; the output port module is configured to connect to a same remote radio unit RRU by using transmission links connected to the at least two output ports; and the processing module is configured to send, according to the first communications signal received by the input port module, a second communications signal to the RRU by using the output port module.

Because multiple transmission links are established between an RHUB and an RRU, a received communications signal is transmitted to the RRU by using different transmission links according to a network standard supported by each transmission link, thereby implementing transmission of a multi-standard signal; in addition, because the multiple transmission links are established between the RHUB and the RRU, a problem of communication interruption due to a fault that occurs in a single transmission link between the RHUB and the RRU is avoided; and further, load balancing can be implemented among different transmission links between the RHUB and the RRU according to load conditions of the different transmission links, thereby effectively ensuring reliability of communications signal transmission between the RHUB and the RRU.

Embodiment 6

Figure 11:
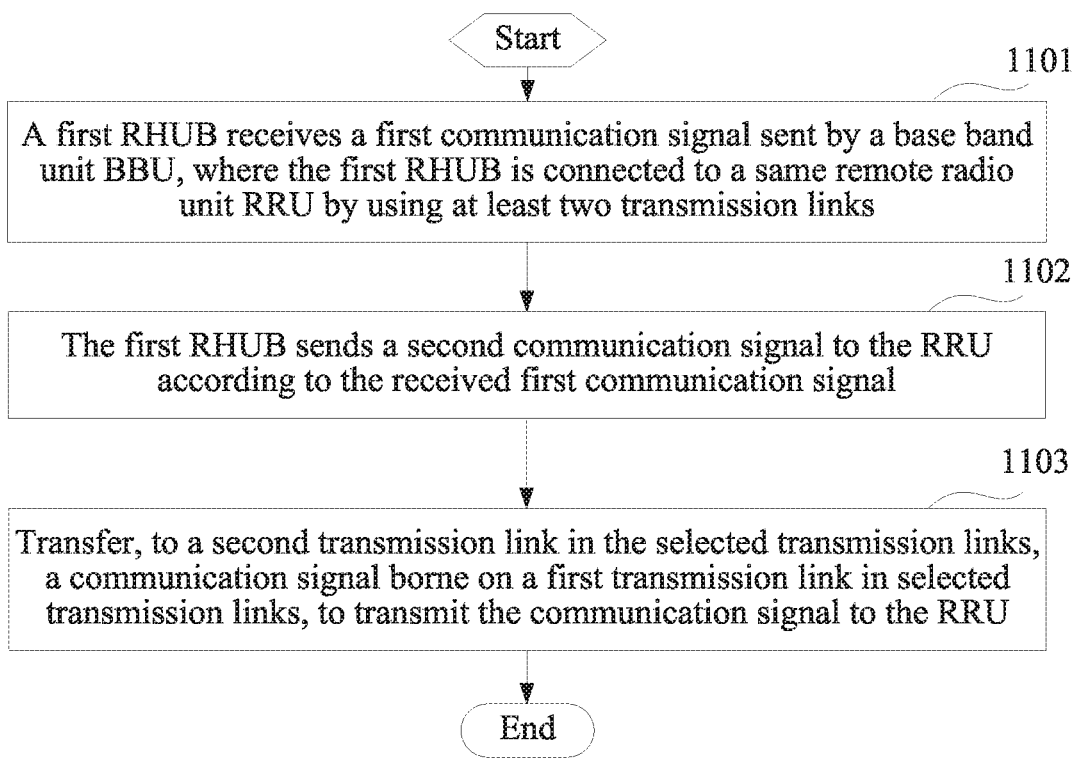
FIG. 11 is a schematic flowchart of a signal transmission method according to Embodiment 6.

As shown in FIG. 11, FIG. 11 is a schematic flowchart of a signal transmission method according to Embodiment 6. The method described in Embodiment 6 is a method having similar concept to Embodiment 1 to Embodiment 5. The method may be described as follows.

Step 1101: A first RHUB receives a first communications signal sent by a BBU, where the first RHUB is connected to a same remote radio unit RRU by using at least two transmission links.

Step 1102: The first RHUB sends a second communications signal to the RRU according to the received first communications signal.

The transmission link may be a CPRI link.

Step 1102 may include: determining a network standard of the first communications signal; selecting, from the at least two transmission links according to the network standard of the first communications signal and a preset correspondence between a network standard and the at least two transmission links, a transmission link for transmitting the second communications signal; and transmitting the second communications signal to the RRU by using the selected transmission link.

Specifically, the transmitting the second communications signal to the RRU by using the selected transmission link may include: when the number of selected transmission links is greater than or equal to 2, determining signal carrying capabilities of the selected transmission links; and distributing, according to the signal carrying capabilities of the selected transmission links, the second communications signal to each transmission link in the selected transmission links, to transmit the second communications signal to the RRU.

The signal carrying capability includes a bandwidth capability, and specifically, the distributing, according to the signal carrying capabilities of the selected transmission links, the second communications signal to each transmission link in the selected transmission links, to transmit the second communications signal to the RRU may include: when a bandwidth of the second communications signal is not greater than a bandwidth capability of each of the transmission links, adjusting the bandwidth of the second communications signal to the bandwidth capability of each of the transmission links, and transmitting the second communications signal to the RRU on each of the transmission links.

Optionally, the method may further include step 1103.

Step 1103: Transfer, to a second transmission link in the selected transmission links, a communications signal borne on a first transmission link in the selected transmission links, to transmit the communications signal to the RRU.

Specifically, the transferring, to a second transmission link in the selected transmission links, a communications signal borne on a first transmission link in the selected transmission links, to transmit the communications signal to the RRU may include: before transferring, to the second transmission link for transmission, the communications signal borne on the first transmission link, transferring, to the second transmission link according to the bandwidth capability of the second transmission link and a current bandwidth of the communications signal transmitted on the first transmission link and on the second transmission link, all or a part of the communications signal borne on the first transmission link, to transmit the communications signal to the RRU.

According to the signal transmission method provided by this embodiment, because multiple transmission links are established between an RHUB and an RRU, a received communications signal is transmitted to the RRU by using different transmission links according to a network standard supported by each transmission link, thereby implementing transmission of a multi-standard signal; in addition, because the multiple transmission links are established between the RHUB and the RRU, a problem of communication interruption due to a fault that occurs in a single transmission link between the RHUB and the RRU is avoided; and further, load balancing can be implemented among different transmission links between the RHUB and the RRU according to load conditions of the different transmission links, thereby effectively ensuring reliability of communications signal transmission between the RHUB and the RRU.

Persons skilled in the art should understand that the embodiments may be provided as methods, apparatuses, or computer program products. Therefore, embodiments may use a form of complete hardware embodiments, complete software embodiments, or embodiments combining software and hardware. Moreover, the embodiments may use a form of a computer program product that is implemented on one or more computer-usable storage mediums (including but not limited to a disk memory, a compact disk read only memory (CD-ROM), an optical memory, and the like) that include computer-usable program code.

The embodiments are described with reference to the flowcharts and/or block diagrams of the method, the apparatus, and the computer program product according to the embodiments of the embodiments. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processing module of another programmable data processing device to generate a machine, so that the instructions executed by a computer or a processing module of another programmable data processing device generate an apparatus for implementing a specific function in one or more processes in the flowcharts and/or in one or more blocks in the block diagrams.

These computer program instructions may also be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although exemplary embodiments have been described, persons skilled in the art can make changes and modifications to these embodiments once they learn the basic inventive concept. Therefore, the following claims are intended to be construed as to cover the exemplary embodiments and all changes and modifications falling within the scope of the embodiments.

Obviously, persons skilled in the art can make various modifications and variations to the embodiments without departing from the spirit and scope of the embodiments. In this way, the embodiments are intended to cover these modifications and variations provided that these modifications and variations to the embodiments fall within the scope of claims of the embodiments and their equivalent technologies.

What is claimed is:

1. An indoor communications system comprising a first remote radio unit hub (RHUB), comprising:
   a first processor; and
   a first non-transitory computer readable storage medium storing a first program for execution by the first processor, the first program including instructions to:

connect to a baseband unit (BBU) in a wired manner;
receive a first communications signal sent by the BBU;
connect to a second RHUB in a wired manner;
connect to a first radio resource unit (RRU) in a wired manner;
determine whether to send a second communications signal to the second RHUB or to the first RRU, according to the first communications signal; and
send the second communications signal to the second RHUB, when it is determined to send the second communications signal to the second RHUB instead of the first RRU;
wherein the second RHUB is connected to the first RRU in a wired manner, or to a second RRU in a wired manner.

2. The indoor communications system according to claim 1, wherein the first communications signal comprises identification information indicating a destination address of the first communications signal, wherein the instructions to send the second communications signal further comprise instructions to:
determine, according to the identification information, whether the destination address of the first communications signal is an address of the second RHUB; and
send, according to the first communications signal, the second communications signal to the second RHUB in response to determining that the destination address of the first communications signal is the second RHUB.

3. The indoor communications system according to claim 1, wherein the instructions to connect to the second RHUB comprise instructions to connect to the second RHUB by using a common public radio interface (CPRI) link.

4. The indoor communications system according to claim 1, wherein the first RHUB further comprises a plurality of output ports, wherein the instructions to connect to the first RRU comprise instructions to connect to the first RRU separately using a plurality of transmission links connected to the plurality of output ports.

5. The indoor communications system according to claim 4, wherein the first program further comprises instructions to:
determine a network standard of the first communications signal;
select, according to the network standard of the first communications signal and a preset correspondence between a network standard and the plurality of output ports, an output port to be a selected second output port for outputting the second communications signal; and
wherein the instructions to send the second communications signal comprise instructions to transmit the second communications signal to the first RRU using the selected second output port.

6. The indoor communications system according to claim 5, wherein the instructions to transmit the second communications signal further comprise instructions to:
determine signal carrying capabilities of the transmission links connected to selected second output ports in response to a number of selected second output ports being greater than or equal to 2; and
distribute, according to signal carrying capabilities of the transmission links connected to the selected second output ports, the second communications signal, to each transmission link in the transmission links connected to the selected second output ports, to transmit the second communications signal to the first RRU.

7. The indoor communications system according to claim 6, wherein the signal carrying capability comprises a bandwidth capability, and wherein the instructions to transmit the second communications signal further comprise instructions to:
adjust a bandwidth of the second communications signal to be transmitted on each of the transmission links to a bandwidth capability of the transmission link, in response to the bandwidth of the second communications signal being transmitted on the transmission link not being greater than the bandwidth capability of the transmission link; and
transmit the second communications signal with an adjusted bandwidth to the first RRU on each of the transmission links, in response to adjusting the bandwidth for the transmission link.

8. The indoor communications system according to claim 1, wherein the instructions to send the second communications signal further comprise instructions to:
send, according to the first communications signal, the second communications signal, to the first RRU, in response to the first communications signal comprising identification information indicating a destination address of the first communications signal, wherein the destination address of the first communications signal is an address of the first RRU.

9. The indoor communications system according to claim 1, wherein the the second RHUB is connected to the second RRU that is different from the first RRU.

10. The indoor communications system according to claim 1, wherein the instructions to connect to the BBU further comprise instructions to connect to the BBU using a digital conversion unit (DCU);
wherein the instructions to receive the first communications signal comprise instructions to receive, using the DCU, the first communications signal, wherein the first communications signal is a digital signal; and
wherein the first RHUB is coupled to a third RRU.

11. A method comprising:
receiving, by a first remote radio unit hub (RHUB), a first communications signal sent by a baseband unit (BBU), wherein the first RHUB is connected to the BBU in a wired manner;
determining, by the first RHUB, whether to send a second communications signal to a second RHUB or to a first radio resource unit (RRU), according to the first communications signal, wherein the first RHUB is connected to the second RHUB in a wired manner, and to the first RRU in a wired manner;
sending, by the first RHUB, the second communication signal to the second RHUB, when it is determined to send the second communications signal to the second RHUB instead of the first RRU; and
wherein the second RHUB is connected to the first RRU in a wired manner, or to a second RRU in a wired manner.

12. The method according to claim 11, wherein the first communications signal comprises identification information indicating a destination address of the first communications signal; and
wherein sending, by the first RHUB, the second communications signal comprises:
determining, according to the identification information, whether the destination address of the first communications signal is the second RHUB; and
transmitting the second communications signal to the second RHUB in response to the destination address of the first communications signal being an address of the second RHUB.

13. The method according to claim 12, wherein sending the second communications signal comprises:
- determining, according to the identification information, whether the destination address of the first communications signal is an address of the first RRU; and
- transmitting the second communications signal to the first RRU in response to the destination address of the first communications signal being the address of the first RRU.

14. The method according to claim 11, wherein the first RHUB and the first RRU are connected by a plurality of transmission links; and
- wherein sending the second communications signal to the first RRU according to the first communications signal comprises:
  - determining a network standard of the first communications signal;
  - selecting, from the plurality of transmission links according to the network standard of the first communications signal and a preset correspondence between a network standard and the plurality of transmission links, a transmission link for transmitting the second communications signal; and
  - transmitting the second communications signal to the first RRU using the selected transmission link.

15. The method according to claim 14, wherein transmitting the second communications signal to the first RRU using the selected transmission link comprises:
- determining signal carrying capabilities of selected transmission links in response to a number of selected transmission links for transmitting the second communications signal being greater than or equal to 2; and
- distributing, according to signal carrying capabilities of the selected transmission links, the second communications signal to each transmission link of the selected transmission links, to transmit the second communications signal to the first RRU.

16. The method according to claim 15, wherein the signal carrying capability comprises a bandwidth capability; and
- wherein distributing, according to the signal carrying capabilities of the selected transmission links, the second communications signal to each transmission link of the selected transmission links, to transmit the second communications signal to the first RRU comprises:
  - adjusting a bandwidth of the second communications signal to be transmitted on each selected transmission link to the bandwidth capability of the selected transmission link, in response to a bandwidth of the second communications signal being transmitted on the selected transmission link not being greater than a bandwidth capability of the selected transmission link; and
  - transmitting, to the first RRU on each of the selected transmission links, the second communications signal.

17. The method according to claim 16, wherein the method further comprises:
- transferring, to a second transmission link in the selected transmission links, the second communications signal on a first transmission link of the selected transmission links, to transmit the second communications signal to the first RRU.

18. The method according to claim 17, wherein transferring, to the second transmission link in the selected transmission links, the second communications signal on the first transmission link of the selected transmission links, to transmit the second communications signal to the first RRU comprises:
- transferring, to the second transmission link according to a bandwidth capability of the second transmission link and a current bandwidth of the second communications signal transmitted on the first transmission link and on the second transmission link, all or a part of the second communications signal on the first transmission link, to transmit the second communications signal to the first RRU.

19. The method according to claim 11, wherein the method further comprises:
- receiving a transmission link request message sent by the BBU, wherein the transmission link request message requests the first RHUB to report information about a connection between the first RHUB and the second RHUB and the RRU that is connected to the second RHUB in a wired manner;
- determining, according to the transmission link request message, information about a first connection between the first RHUB and the second RHUB;
- sending the determined information about the first connection to the BBU;
- determining, according to the transmission link request message, information about a second connection between the first RHUB and the first RRU in response to the first RHUB being connected to the first RRU; and
- sending the determined information about the second connection to the BBU.

20. The method according to claim 11, wherein the second RHUB is connected to the to the second RRU in a wired manner.

21. A method comprising:
- receiving, by a second remote radio unit hub (RHUB), a second communications signal sent by a first RHUB over a wired connection between the second RHUB and the first RHUB, after the first RHUB has determined to send the second communications signal to the second RHUB instead of a first radio resource unit (RRU) over a wired connection between the first RHUB and the first RRU, according to a first communications signal that is sent by a baseband unit (BBU) to the first RHUB over a wired connection between the BBU the first RHUB; and
- sending, by the second RHUB according to the second communications signal, a third communications signal, to a radio resource unit (RRU), over a wired connection between the second RHUB and the RRU, wherein the RRU that is connected to the second RHUB is the first RRU or a second RRU that is different from the first RRU.

22. The method according to claim 21, wherein the RRU that is connected to the second RHUB is the second RRU.

* * * * *